United States Patent [19]
Richards

[11] Patent Number: 5,369,418
[45] Date of Patent: Nov. 29, 1994

[54] DISPLAY APPARATUS, A METHOD OF STORING AN IMAGE AND A STORAGE DEVICE WHEREIN AN IMAGE HAS BEEN STORED

[75] Inventor: Norman D. Richards, Horsham, England

[73] Assignee: U.S. Philips Corporation, New York, N.Y.

[21] Appl. No.: 816,909

[22] Filed: Jan. 3, 1992

Related U.S. Application Data

[63] Continuation of Ser. No. 450,339, Dec. 13, 1989.

[30] Foreign Application Priority Data

Dec. 23, 1988 [GB] United Kingdom ................ 8830210

[51] Int. Cl.⁵ ............................................... G09G 1/02
[52] U.S. Cl. .................................... 345/185; 345/201; 348/571
[58] Field of Search ............... 345/185, 201; 348/571, 348/714–716; 360/10.1

[56] References Cited

U.S. PATENT DOCUMENTS

| | | | |
|---|---|---|---|
| 4,383,279 | 5/1983 | Kenney, II | 358/342 |
| 4,768,092 | 8/1988 | Ishikawa | 358/105 |
| 4,816,929 | 3/1989 | Bradley et al. | 360/10.1 |
| 4,866,520 | 9/1989 | Nomura et al. | 340/728 |

*Primary Examiner*—Ulysses Weldon
*Attorney, Agent, or Firm*—Leroy Eason

[57] ABSTRACT

A display apparatus comprises a memory (20) and a display controller (22) adapted to read lines of an image stored in the memory in accordance with a raster-scan pattern for synchronous display. Elements are provided for periodically reconfiguring the display controller (22) so as to display an image having lines comprising pixel values interpolated between the pixel values of adjacent lines of the stored image. The display apparatus may include elements (10) for reading an image from an optical disc in accordance with the Compact Disc Interactive Standard (CD-I). A method of storing an image comprises storing picture information in combination with program information defining the required periodic reconfiguration of the display controller.

10 Claims, 4 Drawing Sheets

Fig.3

| a | x | b | x | c | x |
|---|---|---|---|---|---|
| x | x | x | x | x | x |
| d | x | e | x | f | x |
| x | x | x | x | x | x |

Fig.4

| a | a | b | b | c | c |
|---|---|---|---|---|---|
| a | a | b | b | c | c |
| d | d | e | e | f | f |
| d | d | e | e | f | f |

Fig.5

| $a$ | $\frac{a+b}{2}$ | $b$ | $\frac{b+c}{2}$ | $c$ |
|---|---|---|---|---|
| $\frac{a+d}{2}$ | $\frac{a+b+d+e}{4}$ | $\frac{b+e}{2}$ | $\frac{b+c+e+f}{4}$ | $\frac{c+f}{2}$ |
| $d$ | $\frac{d+e}{2}$ | $e$ | $\frac{e+f}{2}$ | $f$ |
| $\frac{d+g}{2}$ | $\frac{d+e+g+h}{4}$ | $\frac{e+h}{2}$ | $\frac{e+f+h+i}{4}$ | $\frac{f+i}{2}$ |
| $g$ | $\frac{g+h}{2}$ | $h$ | $\frac{h+i}{2}$ | $i$ |

Fig.6

| $a$ | $\frac{a+b}{2}$ | $b$ | $\frac{b+c}{2}$ | $c$ |
|---|---|---|---|---|
| X | X | X | X | X |
| $d$ | $\frac{d+e}{2}$ | $e$ | $\frac{e+f}{2}$ | $f$ |
| X | X | X | X | X |
| $g$ | $\frac{g+h}{2}$ | $h$ | $\frac{h+i}{2}$ | $i$ |

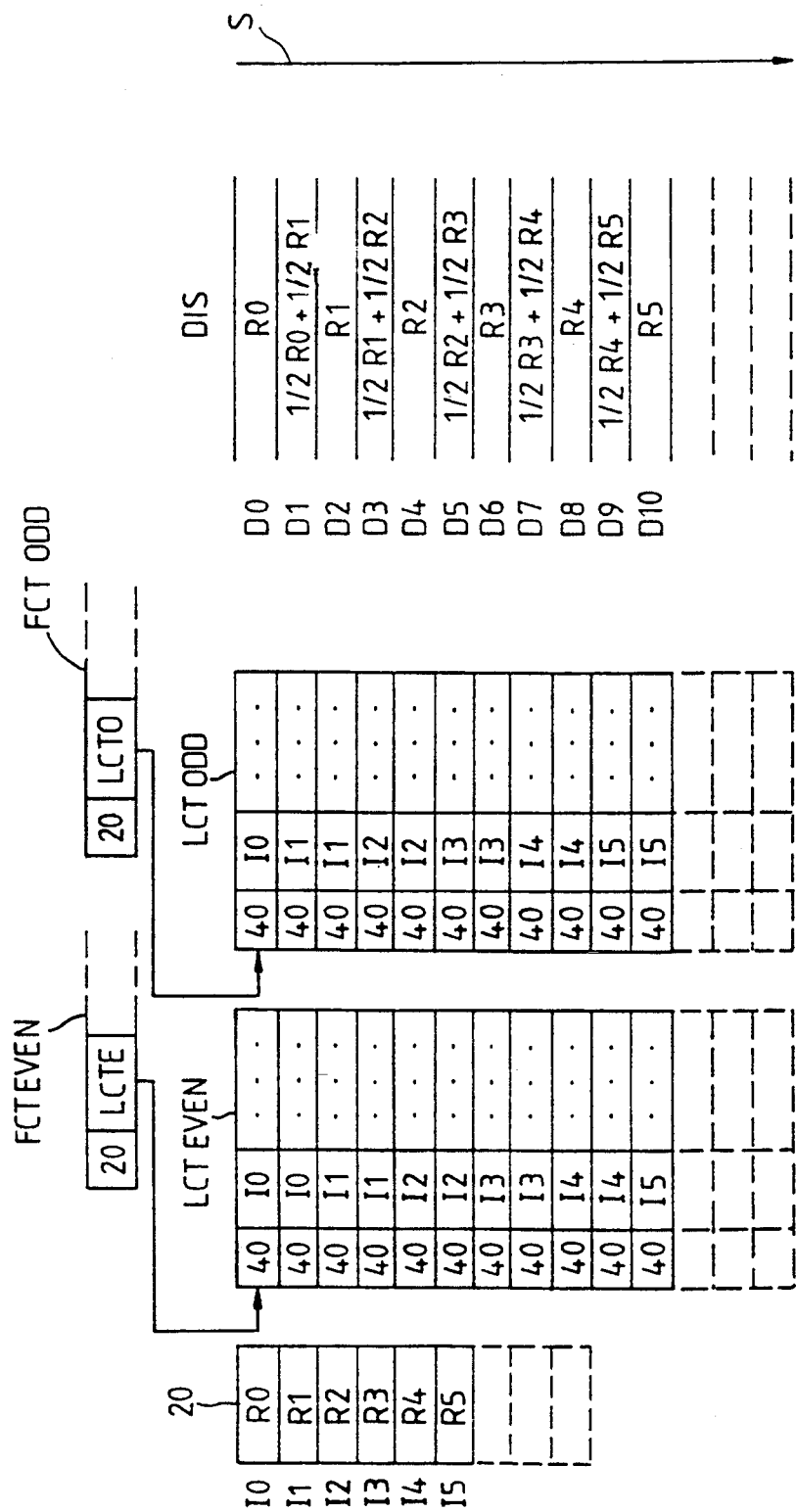

DISPLAY APPARATUS, A METHOD OF STORING AN IMAGE AND A STORAGE DEVICE WHEREIN AN IMAGE HAS BEEN STORED

This application is a continuation of Ser. No. 07/450,339 filed Dec. 13, 1989.

BACKGROUND OF THE INVENTION

1. Field of the Invention

The invention relates to a display apparatus comprising a display memory, means for storing in the display memory lines of image data read from a removable storage device, and a display controller constructed for reading in sequence the lines of image data stored in the memory to enable the synchronous display of a raster scan image comprising lines of pixel values defined by the stored lines of image data. The invention further relates to a method of storing an image for subsequent display by such an apparatus and to a removable storage device wherein an image has been stored by such a method.

2. Description of the Related Art

Such display apparatus are known generally in the art, but a particular example is the Compact Disc Interactive (CD-I) player described for example in "CD-I—a Designer's Overview" published by Kluwer (ISBN 9020121103).

In the CD-I system, various image coding options are available. For example, natural photographic images can be encoded and recorded on an optical disc for subsequent retrieval, decoding and display by the CD-I player. The encoding technique used achieves a high degree of data compression, but the data rate of the data channel (the disc reading apparatus) is not high enough to permit sequences of such images to be displayed as moving pictures unless the images are limited to a small area of the available display screen.

Such images can be expanded in the known apparatus to fill a larger screen area, but only by repeating the received pixel values to display each value over a large block of pixels. This technique introduces a "mosaic" effect, however, which is visually obtrusive and generally undesirable.

It is known that satisfactory expansion of digitised images can be achieved by using linear interpolation to generate intermediate pixel values. The interpolation can be performed substantially independently in the line scan (hereinafter "horizontal") and field scan (hereinafter "vertical") directions.

Techniques for performing vertical interpolation are known, for example in television studio equipment such as that described in United Kingdom patent application GB-A-2 073 988. In known systems, special memory addressing hardware enables parallel access to two lines of stored pixel values and uses special arithmetic circuits to combine these to form the interpolated values. Such a technique is too expensive for use in high-volume consumer applications. Furthermore, in CD-I for example, images are stored in the differentially coded form in which they are received from the disc, and are only decoded to give the actual pixel values after being read synchronously with the raster scan display.

An alternative technique would be to provide a line buffer to store the decoded pixel values of a line so that they may be combined with values decoded for subsequent line. This solution is similar to that applied in a television display system described in U.S. Pat. No. 4,440,719, but it too is expensive for high-volume consumer applications.

SUMMARY OF THE INVENTION

It is an object of the invention to enable linear interpolation of images in the field scan (vertical) direction within an apparatus of the kind described, in particular to enable the expansion of a received image, and further to do so in a manner which is technically compatible with the CD-I system and relatively inexpensive to implement.

The invention provides a display apparatus as set forth in the opening paragraph, characterised in that the apparatus further comprises means for periodically reconfiguring the display controller to cause selective repeated reading of stored data lines resulting in the display of an image including interpolated lines comprising pixel values interpolated between the pixel values defined by two successive lines of the stored image data.

In the known display apparatuses, the display controller is loaded with the addresses at which the image data are stored in the memory and the desired position of the image on the display, if these are not already determined by the nature of the system. The display controller then automatically scans the appropriate locations in the memory and passes the stored values (decoded if necessary) to a display device at the appropriate time in the raster-scan cycle of the display device. However, the display controller can be reconfigured between fields or between scan lines in order to change or move the image displayed, or to display a different part of a stored image.

The invention makes use of this facility by periodically reconfiguring the display controller during display so as to display an image having lines comprising pixel values interpolated between the pixel values of two adjacent lines of the stored image. This affords a major improvement to the display of moving images by apparatus such as the CD-I player while requiring little or no additional hardware, since there is no need to decode, calculate or store the interpolated values prior to display.

A first embodiment of a display apparatus in accordance with the invention is a modification of a display apparatus having first and second parallel display channels each with an associated display memory. In some known display apparatuses, including the CD-I player, two (or more) independent display channels are provided to enable for example rapid switching between two stored images. In the CD-I system, the two images can be combined in controlled proportions so as to produce a wide range of effects such as fades, dissolves, wipes, mattes and even colour-keying.

The said first embodiment of the invention provides display apparatus wherein the storing means are arranged for storing successive data lines defining the image alternately in first and second display memories associated with first and second parallel display channels respectively, the means for periodically reconfiguring the display controller being arranged to operate during line blanking periods in the display of the image to vary the relative contributions from the two display channels from line to line of the displayed image. By using both display channels to store alternate lines of the same image, the facility to reconfigure the display controller to vary the lines displayed and their relative intensities can thus be used to display interpolated images without the use of special interpolation hardware.

This first embodiment of the invention can in principle be used to expand or even compress an image by any amount, provided that the appropriate contributions can be defined for each line. However, the invention is of particular merit when the displayed image has more lines than the stored image. The facility to expand images received for example from an optical disc or other limited-bandwidth channel enables the display of satisfactory moving images at a greater rate and/or over a greater screen area than would otherwise be possible, at little or no extra cost. The actual resolution of the expanded image will of course be no better than that of the received image but this may not be a significant problem with moving images, where the eye is less sensitive to fine detail. The displayed image may have substantially twice as many lines as the stored image. The actual number of lines displayed may be one or two less than twice the number stored, since information is not available for interpolation beyond the first and last lines stored. In such an embodiment, a set of lines comprising pixel values taken from only the first or the second display channel may be interleaved with a set of lines comprising substantially equal contributions from both display channels. This provides accurate interpolation and makes fullest use of the information in the received lines.

In a second embodiment of the invention which does not require the use of two display channels, the means for periodically reconfiguring the display controller are arranged to operate during field blanking intervals in the display of the image so that each interpolated line comprises pixel values defined in some fields by one and in some fields by the other of two adjacent lines of the stored image data, the required interpolated pixel values in each interpolated line being formed by the time-averaged value of each pixel as perceived by a person viewing successive fields of the image. Provided that the field rate of the display is adequate, the viewer's persistence of vision will ensure that the time-averaged value of each pixel is perceived. It will be appreciated that for interlaced displays, the display controller may be configured between fields or between frames. No further distinction will be made between fields and frames in this description.

This second embodiment will introduce an increasing amount of flicker as the expansion factor increases. With presently available field rates (50/60 Hz), a two fold expansion can be provided with an acceptable level of flicker. In that case, every second line of the displayed image may comprise pixel values defined by a corresponding line of the stored image data while each intervening line of the displayed image comprises pixel values defined alternately by one then the other of the two adjacently displayed lines of the stored image data, the time-averaged value of each pixel in each intervening line being the average of the values of the corresponding pixels as defined by the two adjacently-displayed lines of the stored image data.

The display apparatus may include means for reading the said lines of image data from a removable storage device and storing the said image data in the display memory. In such an apparatus a number of images can be retrieved from the storage device quickly enough for the display of satisfactory moving pictures, together with computer programs and/or audio data if desired.

The reconfiguring means for the display controller may include a microprocessor which already forms part of the display apparatus under the control of a program read from the storage device, so that no hardware modification is necessary. In particular, the display apparatus may be constructed in accordance with the Compact Disc Interactive (CD-I) standard, the means for periodically reconfiguring the display controller comprising means for loading the Display Control Program as defined in that standard. The existing CD-I system hardware can thus display satisfactory moving images larger than hitherto and with no deviation from the standard.

The invention further provides a method of storing an image for subsequent display by a display apparatus in accordance with the invention as set forth in the preceding paragraphs, the method comprising combining picture information in the form of lines of image data with program information defining the required periodic reconfiguration of the display controller of the display apparatus and recording the combined picture and program information on a removable storage device, for example an optical disc. Thus the display apparatus can be made to operate automatically in accordance with the invention whenever the image is reproduced. In a CC-I compatible embodiment, the program information may comprise data for setting up the Line and/or Field Control Table.

The invention still further provides a storage device such as an optical disc wherein an image has been stored in accordance with a method as set forth in the preceding paragraph.

BRIEF DESCRIPTION OF THE DRAWINGS

Embodiments of the invention will now be described, by way of example, with reference to the accompanying drawings in which:

FIGS. 3 to 6 illustrate the expansion of a low resolution image in the line scan (horizontal) and field scan (vertical) directions by a pixel hold technique and by linear interpolation;

FIG. 8 illustrates a second embodiment of a method operating a display apparatus in accordance with the present invention.

DESCRIPTION OF THE PREFERRED EMBODIMENT

Figure 1:
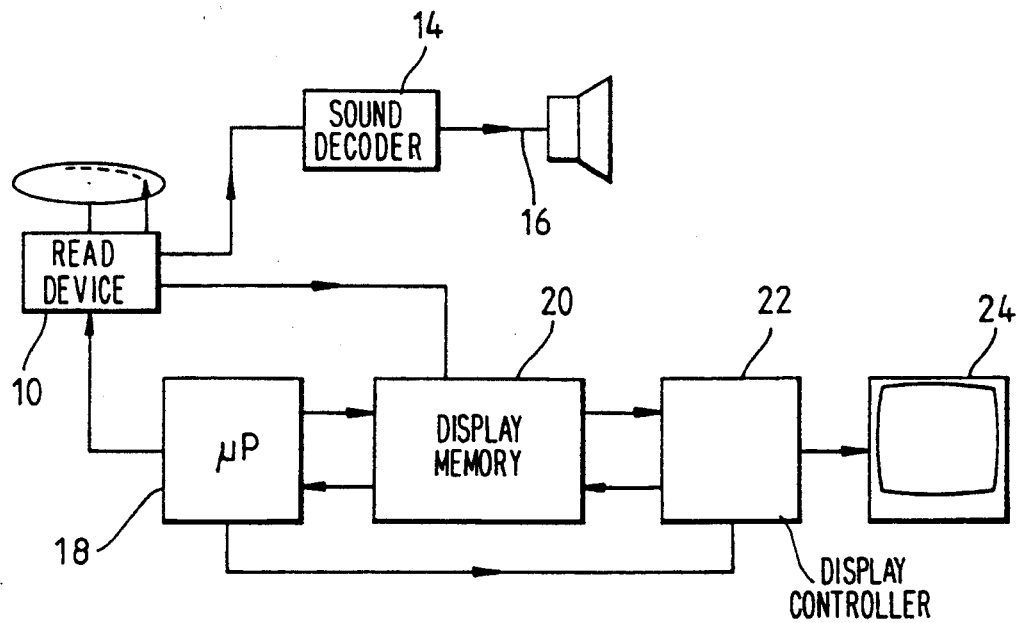
FIG. 1 shows in block schematic form an apparatus suitable for implementing the present invention.

FIG. 1 shows in block schematic form an apparatus of the kind described in the opening paragraph. In the embodiments to be described, the data channel is the output of a record carrier-reading device 10. The device 10 may be a magnetic disc drive, but in particular it may be an optical compact disc (CD) drive, of the form well-known for digital audio reproduction (CD-DA). As in the CD-DA system, the device 10 directs a reading head to appropriate parts of the disc and passes information read from the disc to a sound decoder 14 which provides an audio output at 16.

It is well-known, however, that optical discs and the CD format in particular have wider applications than digital audio, and in a development of the Compact Disc Read-Only Memory (CD-ROM), known as Compact Disc Interactive (CD-I), the apparatus also includes a general-purpose microprocessor 18 which controls the device 10 and can direct parts of the data read from the disc to a memory 20 rather than directly to the sound decoder 14. The data may comprise programs for the microprocessor 18 and encoded picture information in a raster scan format, as well as audio data.

A display controller 22 continually reads appropriate parts of the memory 20 to generate images on a display device 24 such as a TV monitor. Pictures can be encoded according to many different formats, such as straightforward RGB (red, green and blue) values or run-length coded values. In the present example, differential pulse-code modulation (DPCM) is used to achieve a compact presentation of the video information. Various DPCM formats are known, and by way of example only this description will refer to the system known as DYUV (Differential YUV) which is used in the CD-I system to convey natural photographic images, and in particular moving picture sequences.

The whole image in a PAL-compatible system may for example contain 280 lines of 384 pixels. At 24 bits per pixel for full 8-bit RGB coding the amount of data required to represent a full image would be $280 \times 384 \times 24$ bits which is about 315 kilobytes. Such a large amount of data would take nearly two seconds to read from a compact disc or equivalent data channel so that realistic moving picture retrieval would be impossible. In the DYUV system 8-bit RGB values for each pixel are converted to three 8-bit values Y, U and V, where Y is the luminance and U and V are colour difference values. The Y value for each pixel is then differentially encoded. The U and V values are also differentially encoded but they are first sub-sampled so that only one U or V value is encoded for each pair of pixels. This achieves substantial data compression at the expense of colour resolution. This is acceptable however because the human eye is known to have a relatively low spatial resolution for colours compared with that for luminance.

Therefore for every pair of pixels defined by the input RGB values the differential encoding produces two dY codes, one dU code and one dV code. These codes are combined to form a sixteen-bit code word for each pixel pair. The code words for every pixel pair on every line of the image can be stored in a space of $384 \times 280 \times 16/2$ bits which is about 105 kilobytes—one third of the space required for a full RGB image. Therefore a full-screen, normal resolution DYUV image can be read from an optical disc (or any data channel operating at about 150 kbytes/sec.) in about two thirds of a second.

Figure 2:
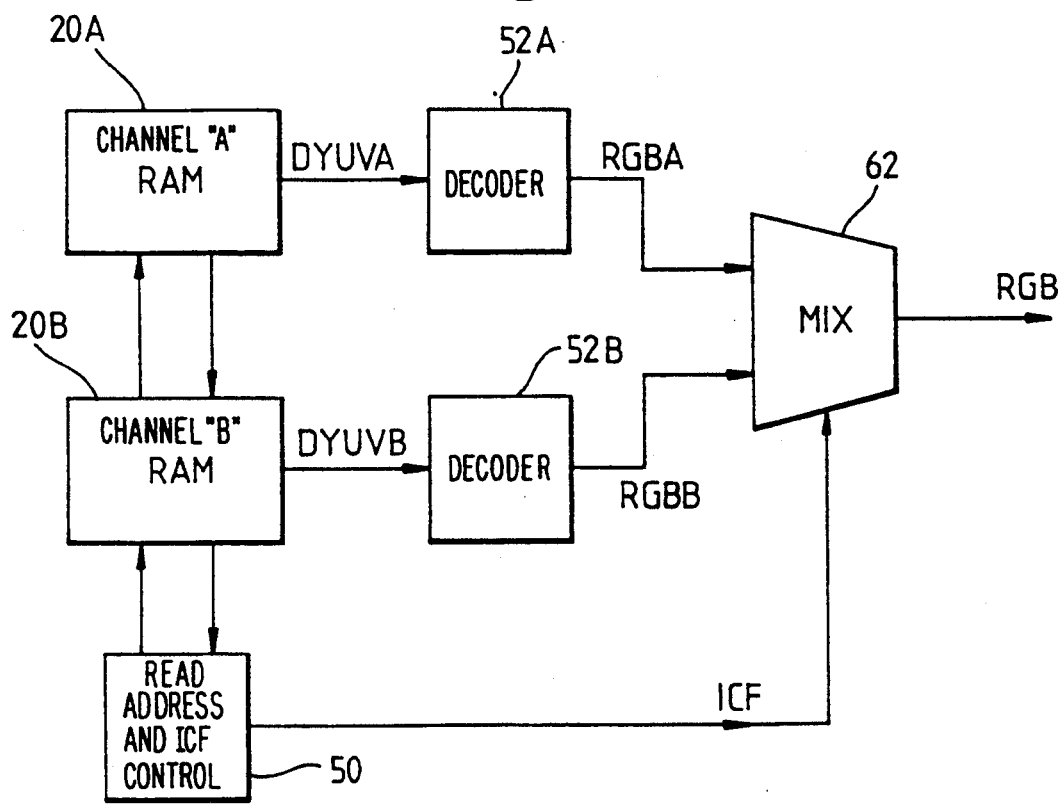
FIG. 2 shows part of the apparatus of FIG. 1 in more detail.

In the apparatus shown in FIG. 1 pixel data (DYUV code words, for example) read from the disc are transferred directly to the memory 20 and are decoded within the display controller 22 synchronously with the display scanning. FIG. 2 shows in more detail the memory 20 and part of the display controller 22 in the apparatus of FIG. 1. The memory 20 is a random access memory (RAM) divided into two banks, 20A and 20B. Each bank 20A and 20B serves as a display memory for one of two display channels A and B respectively, which can be used to combine two different images in various ways (for example mattes, colour keying, fading etc.) to afford a versatile range of display options. The incoming data from the disc can be directed under control of the microprocessor 18 or by means of codes within the data itself to either bank of memory.

Once in the memory 20A or 20B, the data is addressed under the control of a control section 50 of the display controller 22. Areas within the memory 20 are used for the storage of a Display Control Program (DCP) which tells the control section 50 which locations in the memory 20 correspond to which parts of the screen as described below. The control section 50 then generates the addresses required to scan the memory banks 20A and 20B synchronously with the raster scan of the display screen 24 (FIG. 1). In the CD-I system, part of the display controller's function is performed by the microprocessor 18 under the control of interrupt signals synchronised with the display scanning, as described below.

The DYUV code words read from the memory 20A or 20B are passed to respective real-time decoder circuits 52A and 52B. The decoders 52A and 52B generate a set of RGB values for each channel, RGBA and RGBB. The two picture signals RGBA and RGBB are linearly combined by a mixer 62 in proportions defined by an Image Contribution Factor (ICF) associated with each channel which is supplied by the control section 50 to generate the final 3-by-8-bit RGB display output at 64. The Image Contribution Factor for a channel can be defined either for an entire field or line by line by means of instructions in the Display Control Program (DCP). The nature and operation of the DCP will be described in more detail below with reference to particular embodiments of the invention.

Since the decoding circuitry operates in real-time, synchronously with the display scanning, it will be appreciated that the factor which most severly limits the ability of the known apparatus to display moving pictures is the rate at which data can be read from the optical disc or other data channel (one full image every two thirds of a second). To display moving images a refresh rate of at least 12 and preferably 24 to 30 images per second is necessary. Different techniques may be adopted to increase the image refresh rate. One technique would be to use a more highly compressed coding technique such as that developed by General Electric in the DVI system, described for example in Electronics magazine, Nov. 26th 1987 at pages 97 to 99. However, the DVI coding demands very powerful computing apparatus to encode the images, and the real-time decoders required are too expensive for consumer products.

Within a consumer product such as CD-I, a simple method to reduce the amount of data required for moving pictures is to reduce the resolution with which it is displayed. This is possible because the viewer tends to be less critical of the resolution of moving pictures than still pictures. Alternatively the area of the screen that is used for moving pictures may be reduced or both methods may be used in combination.

An example of reducing the area of the screen is to use the normal display resolution and to reduce the displayed area to 10 per cent of the full screen area. This reduces the coded display information to about 10 kilobytes, thus enabling images to be refreshed at a rate of 15 per second. If the horizontal and vertical display resolution are both reduced by a factor of 2, then the coded data required can be reduced by a factor of 4, thus enabling the displayed area to be increased to 40% of the total screen area at the same refresh rate. Similarly, a decrease in resolution by a factor of 3 will reduce the data by a factor of 9 and enable the displayed area to be increased to 90% of the total area.

It is inevitable that reducing the resolution in the line scan (horizontal) direction and/or field-scan (vertical) direction will reduce the ability of the viewer to perceive fine detail, but even so the techniques hitherto available for expanding the received image are unsatisfactory either because of their expense or poor performance.

The problem to be addressed will be described with reference to FIG. 3, which shows a small array of pixels (4 lines by 6 pixels) which may represent part of a larger display. The data channel has supplied pixel values a to f which are only sufficient for one in four of the pixels in the array. Therefore the values for the remaining pixels, marked with an 'x' must be synthesised within the decoding apparatus.

A simple solution is illustrated in FIG. 4. Each pixel value a to f is displayed over a small block of adjoining pixel locations. This technique is available within consumer apparatus such as the basic CD-I player, but has the disadvantage that the resultant "mosaic" effect is unnatural and visually obtrusive to viewers.

A better solution is to spatially filter the lower resolution image to generate intermediate pixel values. In its simplest form, illustrated by FIG. 5, this spatial filtering can be performed by linear interpolation. Each intermediate pixel now has a value which is the arithmetic means of the adjacent pixels. A fifth row including received values g, h, i has been added to enable clearer illustration of the interpolation.

The interpolated values may be computed in two stages, first in the horizontal or line scan direction and then in the vertical or field scan direction. The situation after the first stage is illustrated in FIG. 6, wherein the intermediate pixels on the first, third, fifth etc. lines have been given the values $(a+b)/2$ $(b+c)/2$ and so on. After this first stage, the values for the pixels in the second line may be calculated by averaging the corresponding values from the first and third lines. Similarly the fourth, sixth etc., lines can be completed by averaging the values from the third and fifth lines, fifth and seventh lines and so on. The above description simplifies the situation in a real system in that each pixel value will normally be a combination of three colour component values, such as RGB or YUV. The method of interpolation in such systems may vary depending on whether the three components can or cannot be treated independently, as is well-known in the art.

A more serious problem in differentially coded systems such as the DYUV system described above is that the actual pixel values may not be available at all until they are actually being displayed. To save memory space in the CD-I system, for example, the images are stored as received in DYUV format in the memory 20 (FIG. 1) and decoded in real-time by the display controller 22 for each scan of the display. The microprocessor 18 does not have sufficient power to decode the DYUV signals, perform linear interpolation and then re-encode to DYUV in the time available, and any specialised processor for this purpose would greatly increase the cost of the system. The invention avoids such problems by performing interpolation using the decoded pixel values, synchronously with the display scanning, and without the need for special hardware such as that used in the known interpolators.

Two embodiments of the invention will be described which effect linear interpolation in the field scan (vertical) direction. Either method can be performed in an apparatus of the type described, without hardware modification, in other words by a standard CD-I apparatus.

Figure 7:
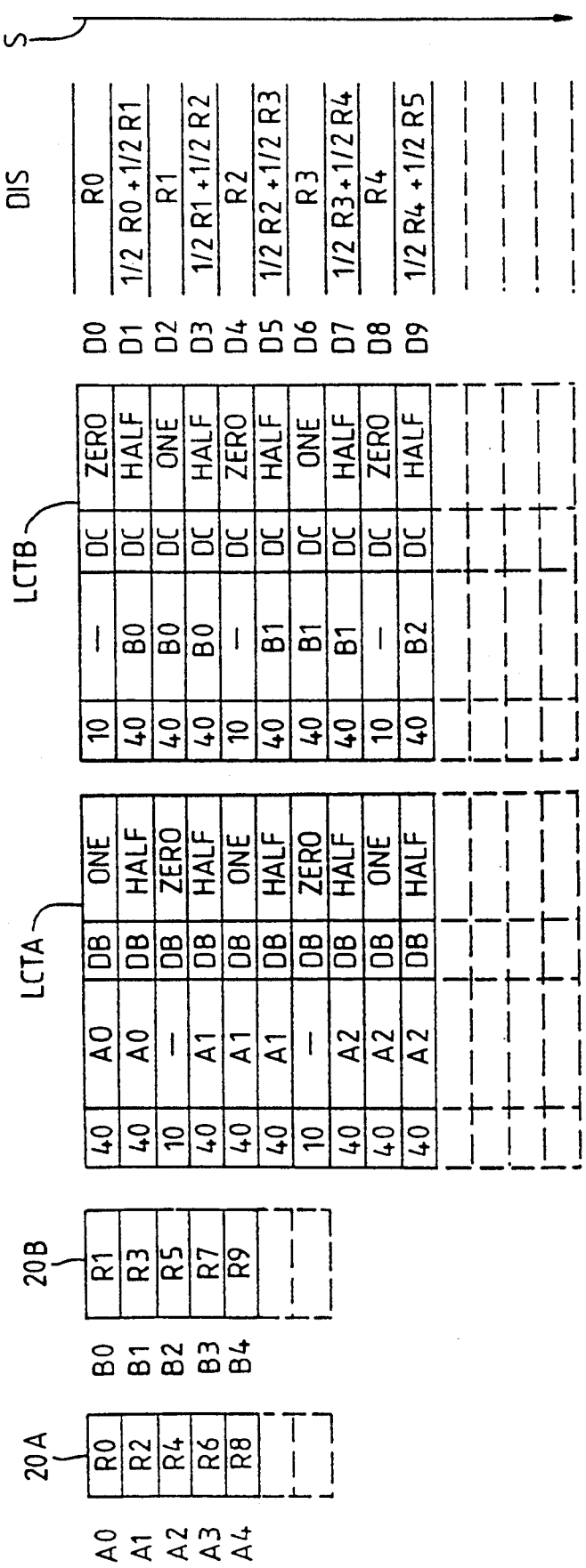
FIG. 7 illustrates a first embodiment of a method of operating a display apparatus in accordance with the present invention.

The first embodiment of a method of operating a display apparatus in accordance with the present invention is illustrated in FIG. 7. The method makes use of the features of the known apparatus described hereinbefore, in particular the feature that: the system has two independent display channels (A and B) which can both contribute in controlled proportions to the displayed image. The method further makes use of a facility available in many known systems which enables the programmer to reconfigure the display controller 22 (FIG. 1) in the blanking periods between display lines if required.

Using the CD-I apparatus as an example, the display controller 22 operates in accordance with a Display Control Program (DCP) stored in part of the memory 20. In operation, the DCP can cause the microprocessor 18 to be interrupted and to carry out instructions in the DCP for example to alter the contents of address registers within the display controller 22. The DCP comprises a Field Control Table (FCT) and Line Control Table (LCT) for each channel (A or B). The instructions in the FCT for a given field are executed in the blanking period before that field. The LCT for a display channel contains an entry for each display line, and each entry can contain up to eight 32-bit instructions to be executed in the blanking period before that display line. In the absence of explicit instructions in the entry for a particular display line, the display controller will increment its registers on the assumption that data for the line to be displayed is stored immediately following the data for the previous line.

Each DCP instruction consists of an 8-bit code and a parameter of up to 24 bits. There are many different instructions available, and only those used in the embodiments to be described will be explained briefly. A "No Operation" instruction is provided (op-code 10 hex; no parameter) for filling any unused instruction fields. A "Load Display Line Start Pointer" instruction is provided to define the address at which the coded pixel data for the next display line is to be read from the memory 20 (Op-code 40 hex; address parameter). A "Load Image Contribution Factor (ICF)" instruction is provided for each channel to define the relative intensity for that channel until it is changed by a subsequent DCP instruction. The op-code for the Load ICF instruction is DB hex in channel A and DC hex in channel B. The parameter for Load ICF is a 6-bit value ICF representing a factor from zero to one.

In FIG. 7, the field scan direction is indicated by the arrow S. Series of pixel codes representing lines of the low resolution image are received from the data channel and the received lines are referenced R0, R1, R2, R3 and so on in the figure. In accordance with this first method of vertical interpolation, these received lines are stored alternately in the A and B banks of image memory (20A and 20B). Thus the line R0 is stored at a first location A0 in the memory 20A, the line R1 is stored at a first location B0 in the memory 20B and so on, as illustrated in FIG. 7.

To display an interpolated low resolution image, Line Control Tables LCTA and LCTB are set up in the memory 20 to vary the image contribution factor for each display channel and to address the memory banks 20A and 20B in a particular fashion as the field scan progresses. LCTA and LCTB are shown in FIG. 7 alongside a representation, labelled DIS, of the lines D0, D1, D2 etc. of the image to be displayed. Each LCT (LCTA and LCTB) contains an entry corresponding to each such display line, and two of the possible eight instructions in each entry are used. Each instruction comprises one of the hexadecimal op-codes defined above and a parameter, where appropriate.

The sequence of operation is dictated by the two LCT's shown as follows:

(D0) the address A0 of the first image line in the A-channel memory is loaded so that the received line R0 is displayed with an ICF of one, while the ICF for the B channel is set to zero;

(D1) the address A0 of the first line in the A-channel is loaded so that the line R0 is displayed again with an ICF of one half, and in the B-channel the address B0 of the first line in the channel memory is loaded so that the line R1 is also displayed with an ICF of one half;

(D2) the address B0 of the first line in the B-channel memory is loaded so that the line R1 is displayed with an ICF of one, while the ICF for the A-channel is set to zero;

(D3) the address A1 of the second line in the A-channel is loaded so that the line R2 is displayed with an ICF of one half and in the B-channel the address B0 of the first line in the B-channel memory is loaded so that the line R1 is displayed with an ICF of one half.

This sequence of alternating full intensity lines R0, R1, R2 etc. from a single display channel with half intensity lines from both channels is repeated to build up a complete image DIS in which alternate lines D1, D3, D5 etc. are interpolated between the values of the adjacent lines. The values may be expanded in the horizontal direction either before or after vertical expansion if desired.

It will be appreciated that the sequence of ICF values used above is not the only one possible. For example, instead of interpolating at half-way points between received lines, the displayed lines D0, D1, D2 etc. could all be interpolated lines, for example at the values one quarter and three quarters of the way between the received lines. The method depicted in FIG. 7 will be seen however to be capable of displaying one more line than is possible with other fractions using the same number of received lines, since it is not possible to interpolate beyond the first and last received lines.

Similarly, two or even more lines could be interpolated between the received lines, for example using ICF's of one-third and two-thirds, to display two interpolated lines between received lines and so achieve a threefold expansion. Non-integer expansion factors and even reduction of images are also possible using this method. The degree of expansion possible is limited only by the acceptability of the resulting low resolution images.

The first method of performing vertical interpolation just described has the disadvantage of requiring the use of both display channels, thus precluding the use of other visual effects which the application designer would otherwise have available.

An alternative, second embodiment of a method in accordance with the invention is illustrated schematically in FIG. 8. Using this embodiment, it is possible to achieve a similar result using only a single display channel. In this second embodiment, the received data R0, R1, R2, etc. is all directed into a single display channel memory 20 (20A or 20B), at addresses I0, I1, I2, etc., and the special display sequence defined, in this example, by the DCP generates interpolated lines by averaging the intensity of adjacent lines over a number of successive field periods.

Two Line Control Tables (LCT's) are stored in the memory, one labelled LCTEVEN and one labelled LCTODD in FIG. 8. Each LCT has an entry corresponding to each line D0, D1, D2, etc. of a displayed image DIS. Only one instruction out of the eight possible is used in each such entry. Two Field Control Tables FCTEVEN and FCTODD are also set up, and are executed before alternate field scans of the displayed image.

The FCT for even-numbered fileds FCTEVEN contains an instruction "Load Control Table Start Pointer" (Op-code 20 hex; address parameter) with the address LCTE at which the table LCTEVEN is stored, so that LCTEVEN forms the LCT for even-numbered fields. The FCT for odd-numbered fields FCTODD contains the same instruction, but with the address LCT0 of the table LCTODD as a parameter, so that LCTODD is the effective LCT in the odd numbered fields.

LCTEVEN and LCTODD contain a series of Load Display Line Start Pointer instructions (Op-code 40 hex) with the addresses I0, I1, I2, etc. of the stored image lines R0, R1, R2, etc. as parameters. The line sequence displayed as a result of this arrangement is as follows:

(D0) the address I0 is loaded so that received line R0 is displayed;

(D1) in even fields, the address I0 is loaded so that line R0 is displayed again, whereas in odd fields the address I1 is loaded so that line R1 is displayed.

This pattern is repeated for lines D2, D3 etc., as shown in FIG. 8 to generate an image DIS in which alternate lines D1, D3, D5, etc. are interpolated, on average, between lines D0, D2, D4, etc. comprising the lines R0, R1, R2, etc. of the received image.

A disadvantage of this embodiment is that it introduces flicker at a rate of half the field rate of the display, but for most source material this is visually acceptable. Clearly the embodiment can be extended to provide a threefold or N-fold expansion, although flicker might soon become unacceptable at current refresh rates.

In a generalised version of the second embodiment capable of producing an N-fold expansion, where N is an integer greater than one, there will be N—1 intervening lines displayed between each pair of stored lines displayed. With K running from 1 to N—1 between one received line and the next, the Kth intervening line might comprise the one received line for N—K out of every N fields and comprise the next received line in the remaining K out of every N fields. In one such embodiment, N different Line Control Tables could be set up and used in rotation. It is easily seen how this general embodiment agrees with the more specific embodiment of FIG. 11 when N=1. To minimise flicker when N is large, the two groups of N—K and K fields for each intervening line should be interleaved as far as possible.

From reading the present disclosure, other modifications will be apparent to persons skilled in the art. Such modifications may involve other features which are already known in the design, manufacture and use of image transmission, recording and displaying systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation of one or more of those features which would be obvious to persons skilled in the art, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. Apparatus for displaying a scaled reproduction of an image defined by pixel data received from an image source, the pixel data including pixel values of successive scan lines in each of successive fields of a raster of said received image; comprising:

a display memory adapted to alternately store in first and second memory banks therein the pixel values of successive scan lines of each successive field of the received image, the first and second memory banks being respectively associated with first and second display channels;

a display controller adapted to sequentially read-out from said memory banks to the associated display channels the pixel values of the successive scan lines in each successive field of the received image; and a microprocessor for periodically reconfiguring the operation of the display controller so that during each field of the received image the display controller introduces between each successive pair of scan lines of said field a linear interpolated scan line, the pixel values of each interpolated scan line being linear weighted combinations of the values of corresponding pixels of the adjoining scan lines, the resulting sequence of scan lines and interpolated scan lines defining a field of said displayed image corresponding to said field of the received image.

2. A display apparatus as claimed in claim 1, wherein said scaled reproduction has more scan lines than the received image.

3. A display apparatus as claimed in claim 2, wherein said display controller is periodically reconfigured so as to introduce between each successive pair of scan lines in said first an second display channels and interpolated scan line having pixel values which include substantially equal proportions of the values of corresponding pixels on the adjoining scan lines, so that the scaled reproduction of the received image will have twice as many scan lines as the received image.

4. A display apparatus as claimed in claim 1, wherein the image source is a data store and the microprocessor periodically reconfigures the operation of the display controller in accordance with a program supplied by said data store.

5. A display apparatus as claimed in claim 4, wherein said data store in an optical disc.

6. A display apparatus as claimed in claim 5, further comprising means for reading from said optical disc the pixel values of successive scan lines of each successive field of the received image and storing such values in said memory banks of the display memory.

7. Apparatus for displaying a scaled reproduction of an image defined by pixel data received from an image source, the pixel data including pixel values of successive scan lines in each of successive fields of a raster of the received image; comprising:

a display memory adapted to store the pixel values of successive scan lines of each successive field of the received image;

a display controller adapted to sequentially read-out from said display memory to an image display channel the stored pixel values of the successive scan lines of each successive field of the received image; and a microprocessor for periodically reconfiguring the operation of the display controller during blanking intervals which follow the successive fields of the received image, so that during each such field the display controller introduces between each successive pair of scan lines of said field of the received image an interpolated scan line comprising pixel values which, in successive fields, alternate between the pixel values of corresponding pixels on alternate ones of the adjacent pair of scan lines, so that a pixel on an interpolated scan line of the displayed image will be perceived as the time average of the pixel values on the adjacent pair of scan lines.

8. Display apparatus as claimed in claim 7, wherein the image source is a data store and said microprocessor periodically effects reconfiguration of the operation of the display controller in accordance with a program supplied by said data store.

9. Display apparatus as claimed in claim 8, wherein said data store comprises an optical disc.

10. Display apparatus as claimed in claim 9, further comprising means for reading from the optical disc the pixel values of successive scan lines of each successive field of the received image and storing such values in said display memory.

* * * * *